(12) United States Patent
Mellor et al.

(10) Patent No.: US 8,991,753 B2
(45) Date of Patent: Mar. 31, 2015

(54) METHOD OF POSITIONING LANDING GEAR

(71) Applicant: The Boeing Company, Chicago, IL (US)

(72) Inventors: Mitchell L. Mellor, Bothell, WA (US); Michael A. Long, Freeland, WA (US); Richard B. Odell, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 62 days.

(21) Appl. No.: 13/900,071

(22) Filed: May 22, 2013

(65) Prior Publication Data
US 2014/0151499 A1 Jun. 5, 2014

Related U.S. Application Data

(62) Division of application No. 12/730,598, filed on Mar. 24, 2010, now Pat. No. 8,448,900.

(51) Int. Cl.
*B64C 25/34* (2006.01)
*B64C 25/10* (2006.01)
*B64C 25/04* (2006.01)
(Continued)

(52) U.S. Cl.
CPC ............. *B64C 25/04* (2013.01); *B64C 25/34* (2013.01); *B64C 25/20* (2013.01); *B64C 2025/008* (2013.01)
USPC .................................... 244/103 R; 244/102 A

(58) Field of Classification Search
USPC ............... 244/102 R, 100 R, 103 R; 702/150; 73/865.8
See application file for complete search history.

(56) References Cited

U.S. PATENT DOCUMENTS 3,083,937 A 4/1963 Norman et al.
3,322,376 A 5/1967 Neilson et al.
4,359,199 A 11/1982 Kramer et al.
(Continued)

FOREIGN PATENT DOCUMENTS

EP 0 295 174 A1 12/1988
GB 2 101 542 A 1/1983
(Continued)

OTHER PUBLICATIONS

Long, M., *Semi-Lever Landing Gear*, Boeing, (2001), pp. 1-13.
(Continued)

*Primary Examiner* — Tien Dinh
*Assistant Examiner* — Assres H Woldemaryam
(74) *Attorney, Agent, or Firm* — Alston & Bird LLP

(57) ABSTRACT

A method of positioning landing gear of an airplane is provided that includes providing the landing gear including a shock strut, a truck beam operatively pivotally connected to the shock strut, first and second interconnected links operatively connected to the truck beam and a third link extending between the shock strut and the first and second links with the third link pivotally connected to the second link at a third pivot. When the landing gear is commanded to a lowered position, the third pivot is positioned in a first position to support a taxi mode, a take-off mode and a landing mode if the landing gear is operational and in a second position to support an alternate landing mode if the landing gear is not fully operational. When the landing gear is commanded to a raised position, the third pivot is in the second position to support a stow mode.

16 Claims, 18 Drawing Sheets

(51) Int. Cl.
*B64C 25/20* (2006.01)
*B64C 25/00* (2006.01)

(56) References Cited

U.S. PATENT DOCUMENTS

| | | | |
|---|---|---|---|
| 4,749,152 | A | 6/1988 | Veaux et al. |
| 4,892,270 | A | 1/1990 | Derrien et al. |
| 4,940,197 | A | 7/1990 | Putnam |
| 5,086,995 | A | 2/1992 | Large |
| 5,429,323 | A | 7/1995 | Derrien et al. |
| 5,460,340 | A * | 10/1995 | White .................. 244/102 A |
| 6,182,925 | B1 | 2/2001 | Kilner et al. |
| 6,345,564 | B1 | 2/2002 | Kilner et al. |
| 6,575,405 | B2 | 6/2003 | Bryant et al. |
| 7,066,429 | B2 * | 6/2006 | Mellor et al. ............ 244/102 R |
| 7,578,466 | B2 * | 8/2009 | Yourkowski et al. ...... 244/102 A |
| 2006/0006282 | A1 * | 1/2006 | Mellor et al. ............ 244/102 A |
| 2007/0158496 | A1 * | 7/2007 | Yourkowski et al. ..... 244/102 R |
| 2009/0050736 | A1 | 2/2009 | Bennett et al. |
| 2009/0108131 | A1 * | 4/2009 | Lavigne et al. .......... 244/102 A |
| 2011/0233327 | A1 * | 9/2011 | Mellor et al. ............ 244/102 A |

FOREIGN PATENT DOCUMENTS

| | | |
|---|---|---|
| GB | 2 428 650 A | 2/2007 |
| WO | WO 2006/094145 A1 | 9/2006 |
| WO | WO 2006/133902 A1 | 12/2006 |

OTHER PUBLICATIONS

Semi-Levered Gear Performs During Boeing 777-300ER Flight-Tests, News Release, Jun. 2003, 1 page.
International Search Report and Written Opinion for Application No. PCT/US2011/025966 dated Aug. 4, 2011.

* cited by examiner

METHOD OF POSITIONING LANDING GEAR

CROSS-REFERENCE TO RELATED APPLICATION

The present application is a divisional application of U.S. patent application Ser. No. 12/730,598, filed Mar. 24, 2010, the contents of which are incorporated herein in their entirety.

TECHNOLOGICAL FIELD

Configurations of the present disclosure relate generally to landing gear and, more particularly, to a semi-levered landing gear and an associated method of positioning the truck beam of the landing gear.

BACKGROUND

An airplane includes landing gear to facilitate takeoff, landing and taxi. The landing gear of some aircraft includes a shock strut that is pivotally attached to a truck beam at a distal or lower end thereof. The truck beam includes two or more axles upon which tires are mounted. In this regard, the truck beam may include a forward axle positioned forward of the shock strut and an aft axle positioned aft of the shock strut. Upon takeoff, an airplane having a conventional landing gear with forward and aft axles will pivot about the pin that attaches the truck beam to the shock strut such that all of the landing gear tires have an equal load distribution.

In order to provide additional ground clearance for rotation of the aircraft during takeoff, semi-levered landing gear mechanisms have been developed. A semi-levered landing gear fixedly positions the shock strut and the forward end of the truck beam during takeoff such that the forward axle is in a raised position relative to the aft axle when the airplane has left the ground. As such, the aircraft pivots about the aft axle, rather than the pin that pivotally connects the truck beam to the shock strut provided that the extend pressure of the shock strut has been increased sufficiently. By rotating about the aft axle, the landing gear height is effectively increased so as to provide additional ground clearance for rotation of the aircraft during takeoff. As a result, the takeoff field length (TOFL) of the aircraft may be reduced, the thrust required of the engines may be reduced or the weight carried by the aircraft may be increased while maintaining the same takeoff field length.

In order to provide for rotation of the aircraft about the aft axle during takeoff, a semi-levered landing gear locks the truck beam in a "toes-up" attitude such that the tires mounted upon the aft axle support the aircraft, while the tires mounted upon the forward axle are raised above the surface of the runway. Following takeoff, the landing gear is generally stowed in a wheel well or the like. In order to fit within a conventional wheel well, the landing gear must typically be unlocked and the truck beam repositioned in a "stowed" attitude prior to retracting the landing gear into the wheel well. Thereafter, during landing, the landing gear is lowered and the truck beam is repositioned such that all of the wheels, including both those on the forward axle and the aft axle, equally bear the weight of the aircraft. Typically, the locking and unlocking of a semi-levered gear system and the resulting repositioning of the truck beam relative to the shock strut occurs without input from the pilot or the flight control system.

One type of semi-levered landing gear includes a locking hydraulic strut to lock the truck beam in the desired orientation for takeoff. The locking hydraulic strut is essentially a locking actuator, but has a number of additional chambers and an internal floating piston. See, for example, U.S. Pat. No. 6,345,564. While a semi-levered landing gear having a locking hydraulic strut is suitable for some aircraft, the landing gear of other aircraft may not have sufficient clearance or room for the hydraulic strut to be positioned between the shock strut and the truck beam in an efficient manner. In addition, the hydraulic strut disadvantageously adds to the cost and complexity of the landing gear.

Another semi-levered landing gear utilizes a mechanical linkage to lock the truck beam during takeoff, but requires a separate mechanical linkage, termed a shrink-link, to reposition the shock strut for retraction into the wheel well. The requirement for a shrink-link disadvantageously increases the complexity, expense and weight of the resulting semi-levered landing gear.

Accordingly, it would be desirable to provide an improved semi-levered landing gear that reliably positions the truck beam in a toes-up attitude during takeoff and then repositions the truck beam in a "stowed" attitude following takeoff for stowage in the wheel well. In particular, it would be desirable to provide a semi-levered landing gear that is both weight and cost efficient and that is not overly complex, while still satisfying the various operational requirements of the semi-levered landing gear.

BRIEF SUMMARY

In accordance with configurations of the present disclosure, a semi-levered landing gear is provided that is configured to position a truck beam in a toes-up attitude during takeoff and then reposition the truck beam in a "stowed" attitude for stowage in a wheel well following takeoff. The semi-levered landing gear of configurations of the present disclosure may be constructed in a manner that is effective from both a cost and a weight standpoint.

In one configuration, a semi-levered landing gear is provided that includes a shock strut having inner and outer cylinders, a truck beam pivotally connected to the inner cylinder of the shock strut and a pair of torsion links connecting the inner and outer cylinders. The semi-levered landing gear of this configuration also includes a first link connected to the truck beam at a first pivot, a second link connected to the first link at a second pivot and a third link connected to the second link at a third pivot and connected to the outer cylinder at a fourth pivot. Further, the semi-levered landing gear of this configuration includes a truck pitch actuation system operatively connected to the third pivot and configured to position the third pivot in one of a first position and a second position.

The truck pitch actuation system of one configuration is configured to maintain the third pivot in the first position in which the third pivot has a fixed first relationship with respect to the outer cylinder, thereby facilitating raising of a forward end of the truck beam, relative to an aft end of the truck beam, during extension of the shock strut. The truck pitch actuation system may also be configured to maintain the third pivot in the second position in which the third pivot has a fixed second relationship with respect to the outer cylinder, thereby facilitating positioning of the truck beam in a stow orientation.

In a further configuration, a method of positioning a truck beam of a landing gear is provided. The method provides a semi-levered landing gear mechanism. The semi-levered landing gear mechanism includes a plurality of links operably connected between a shock strut and a truck beam and a truck pitch actuation system. The method of this configuration positions a forward end of the truck beam in a raised position relative to the aft end of a truck beam by causing the truck pitch actuation system to be in a take-off position while the airplane is in the air. The method of this configuration also positions a forward end of the truck beam in a lower position relative to the aft end of the truck beam by causing the truck pitch actuation system to be in a stow position while the airplane is in the air to facilitate retraction of the landing gear.

In another configuration, a method of positioning the landing gear of an airplane is provided in which the landing gear includes a shock strut, a truck beam operatively pivotally connected to the shock strut, first and second interconnected links operatively connected to the truck beam and a third link extending between the shock strut and the first and second links with the third link pivotally connected to the second link at a third pivot. In the method of this configuration, the landing gear is commanded to a raised or lowered position. In an instance in which the landing gear is commanded to a lowered position and the landing gear is operational, the third pivot positioned in a first position to support a taxi mode, a take-off mode and a landing mode. In an instance in which the landing gear is commanded to a lowered position and the landing gear is not fully operational, the third pivot is positioned in a second position to support an alternate landing mode. Further, in an instance in which the landing gear is commanded to a raised position the third pivot is positioned in the second position to support a stow mode.

The features, functions and advantages that have been discussed may be achieved independently in various configurations of the present disclosure and may be combined in yet other configurations, further details of which may be seen with reference to the following description and drawings.

BRIEF DESCRIPTION OF THE SEVERAL VIEWS OF THE DRAWINGS

Figure 1:
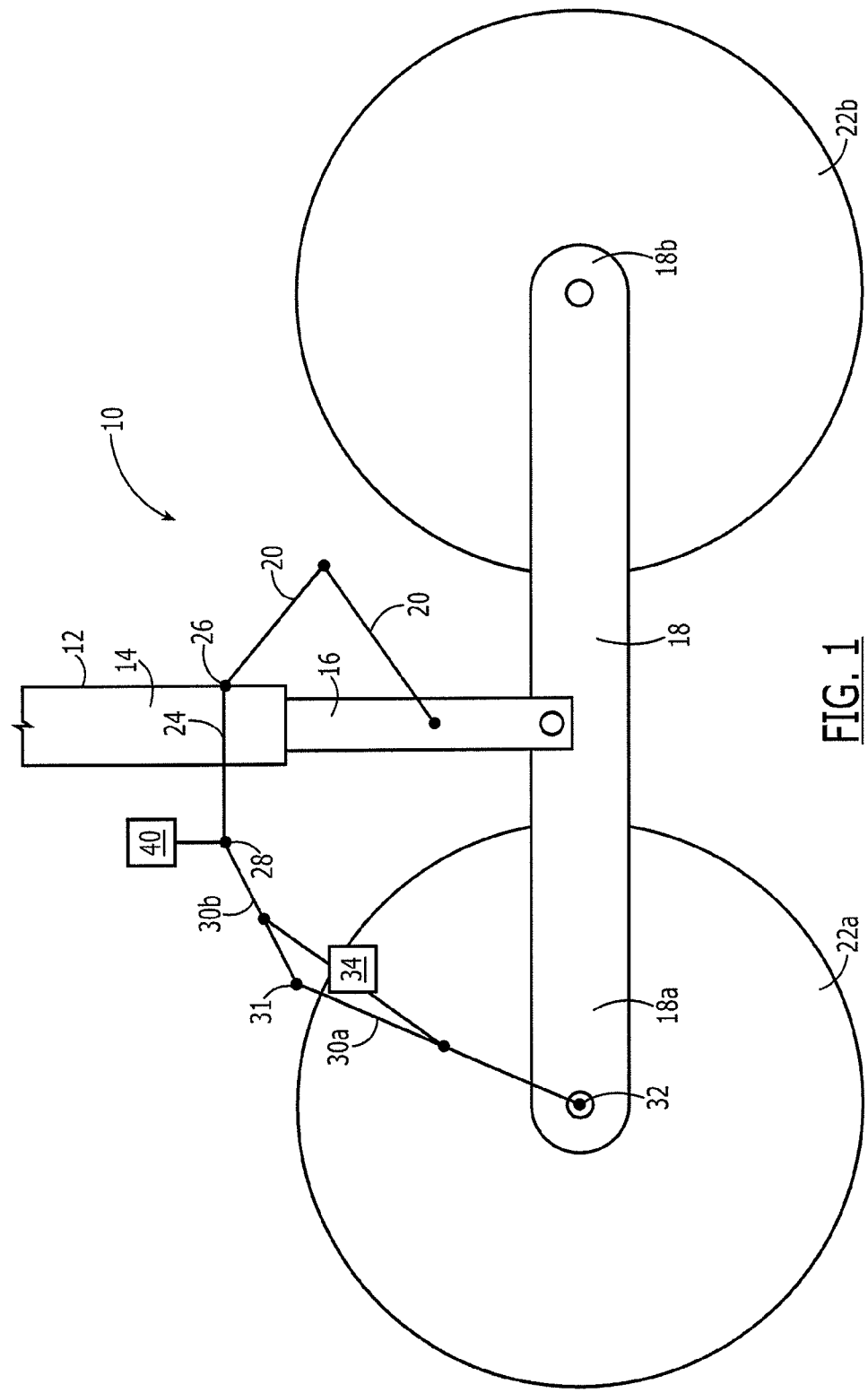
Figure 2:
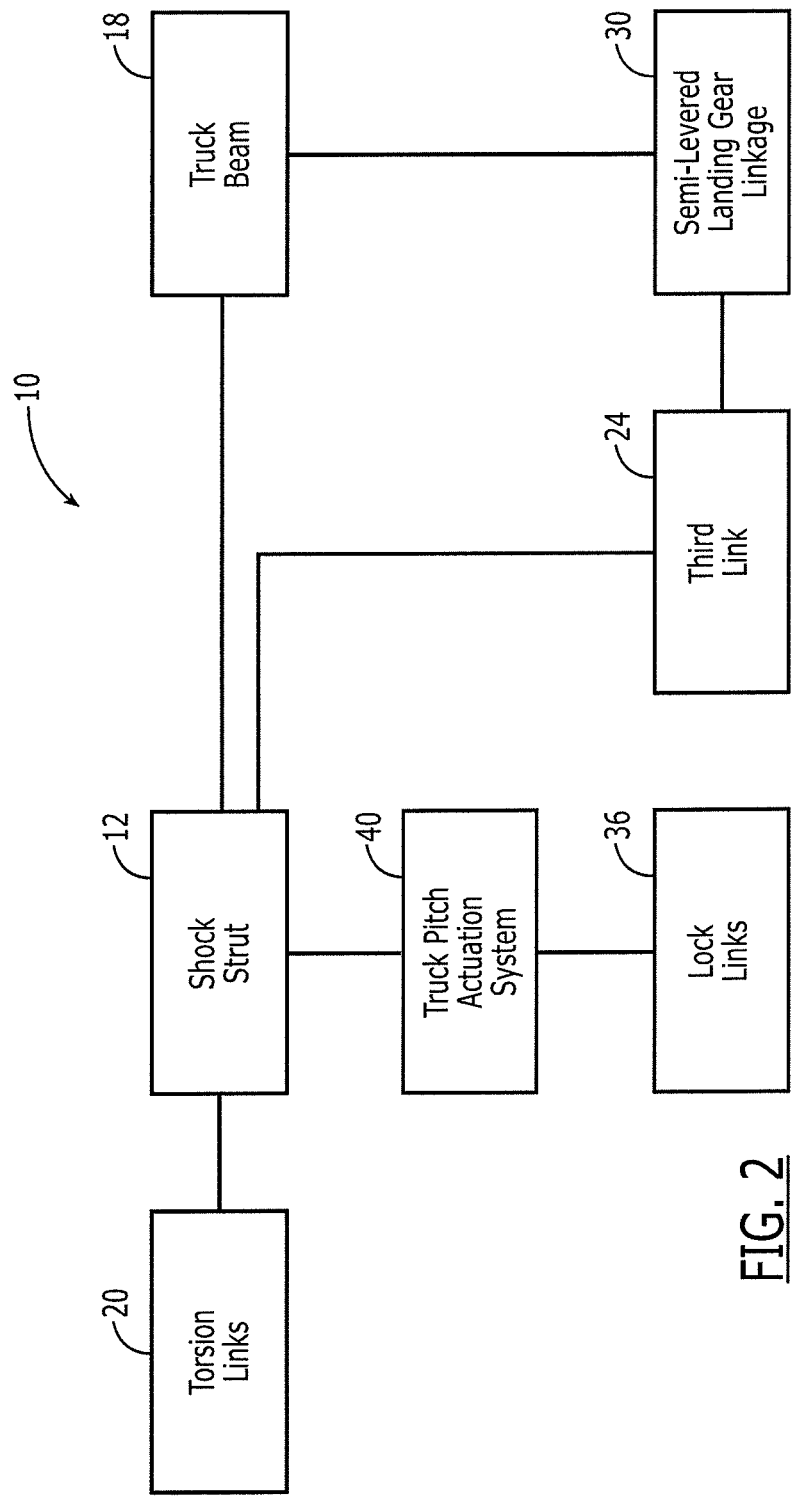
Figure 3:
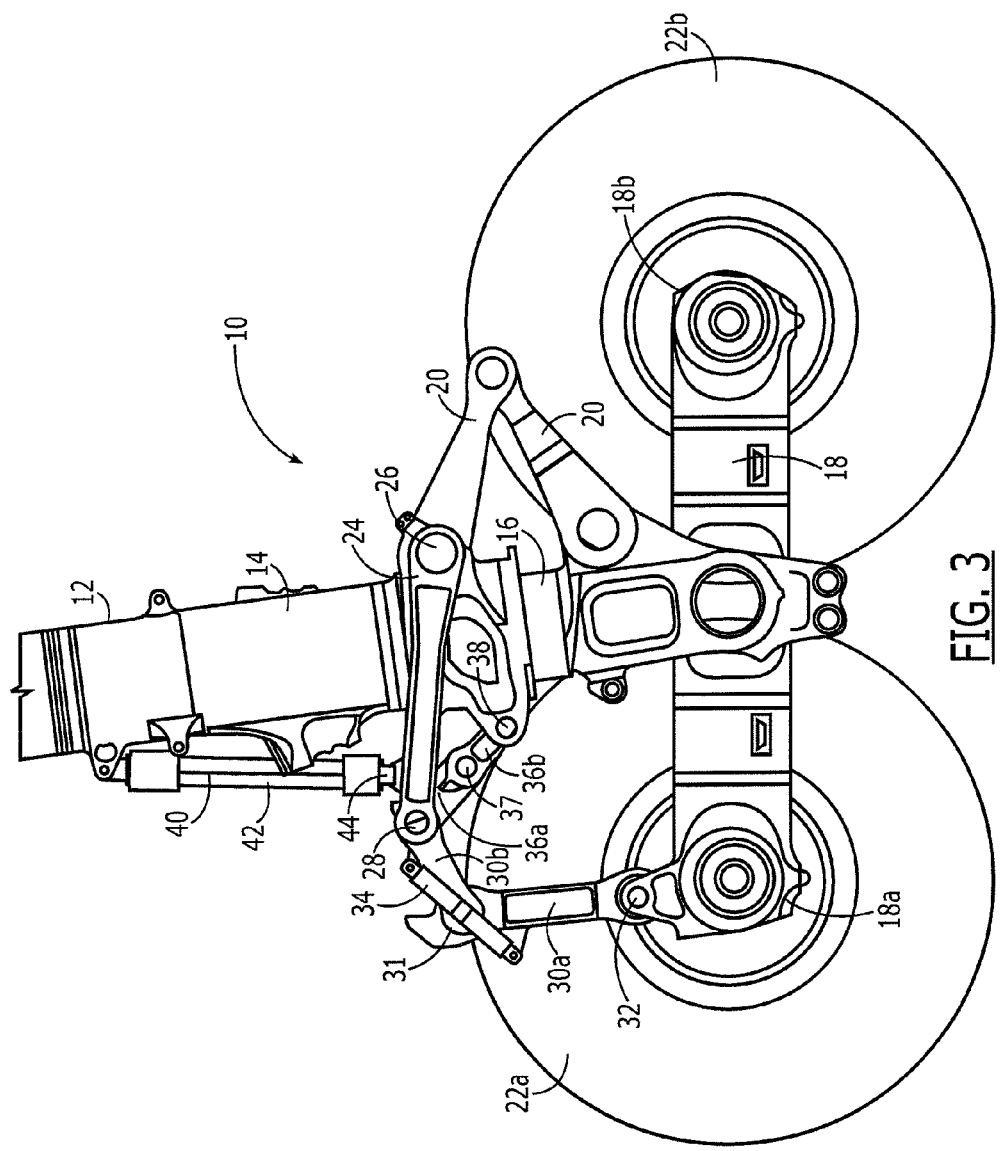
Figure 4:
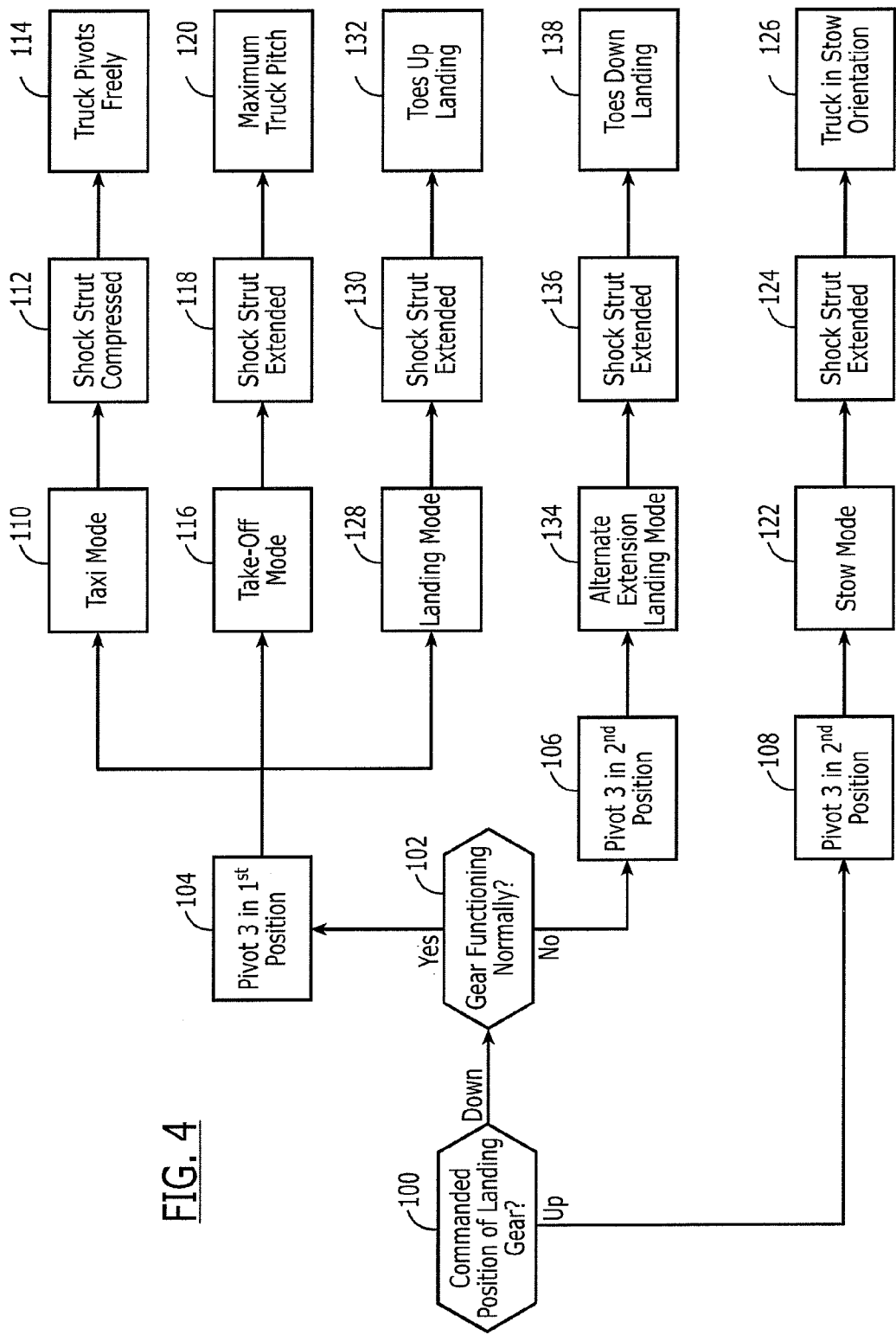
Figure 5:
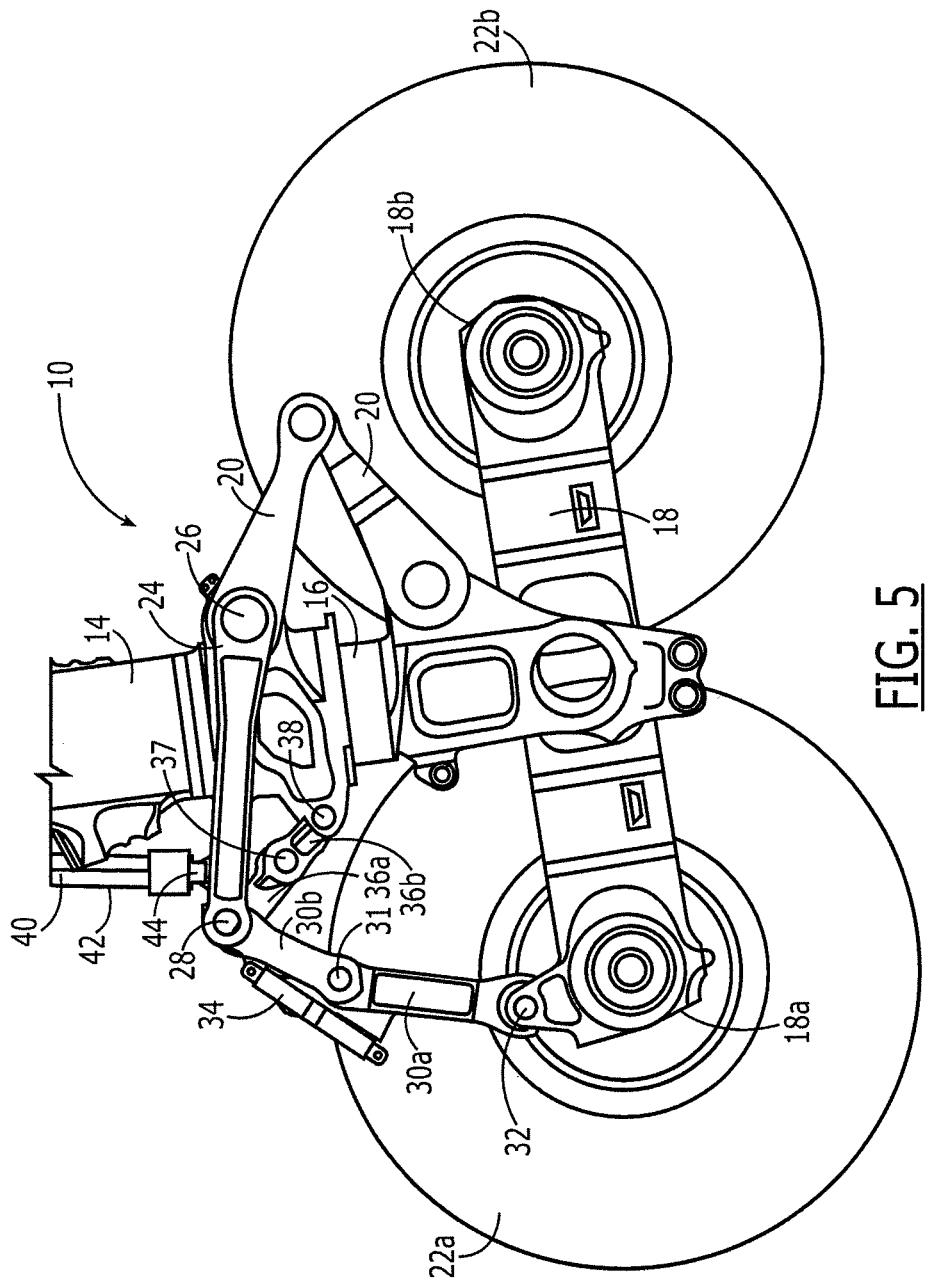
Figure 6:
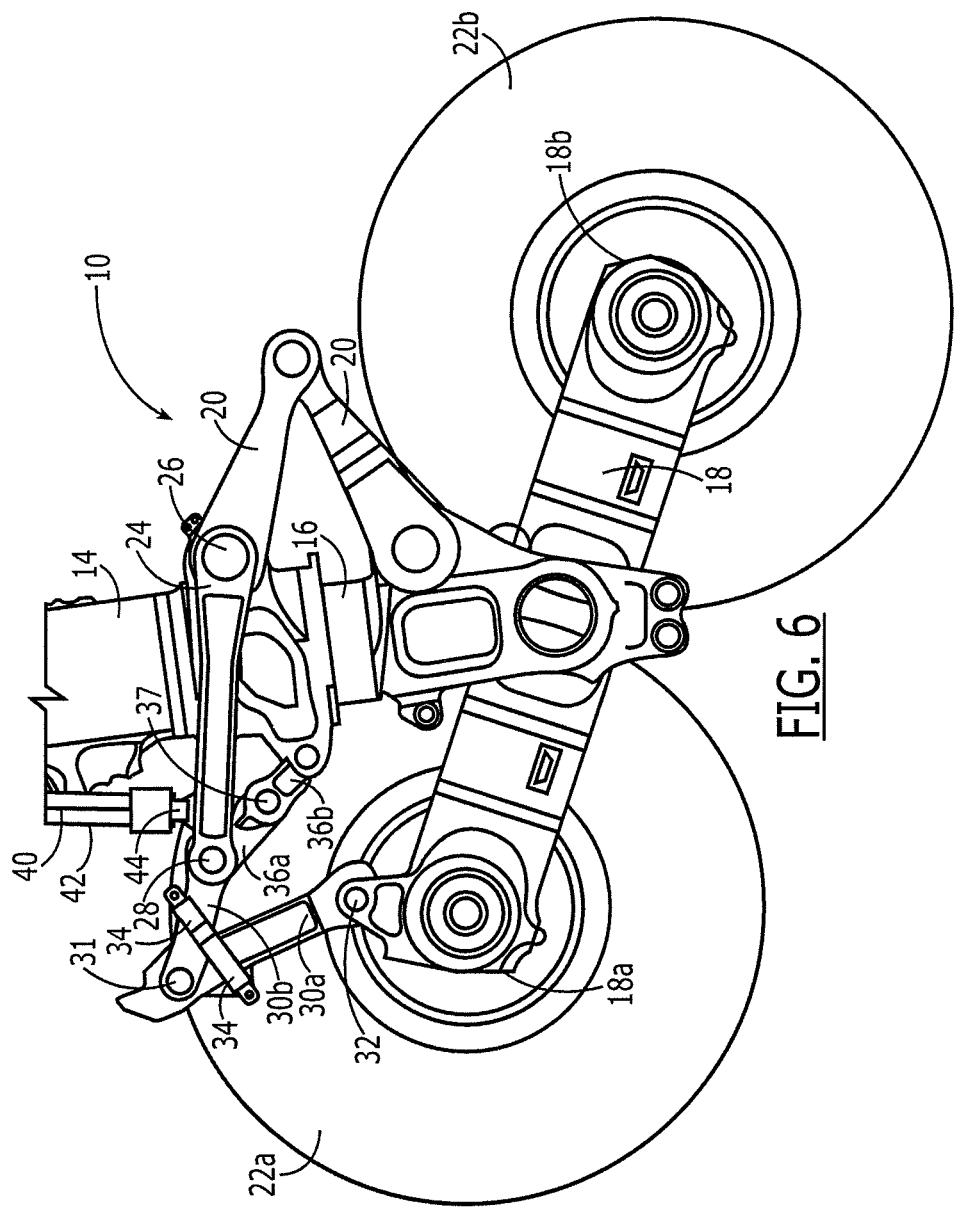
Figure 7:
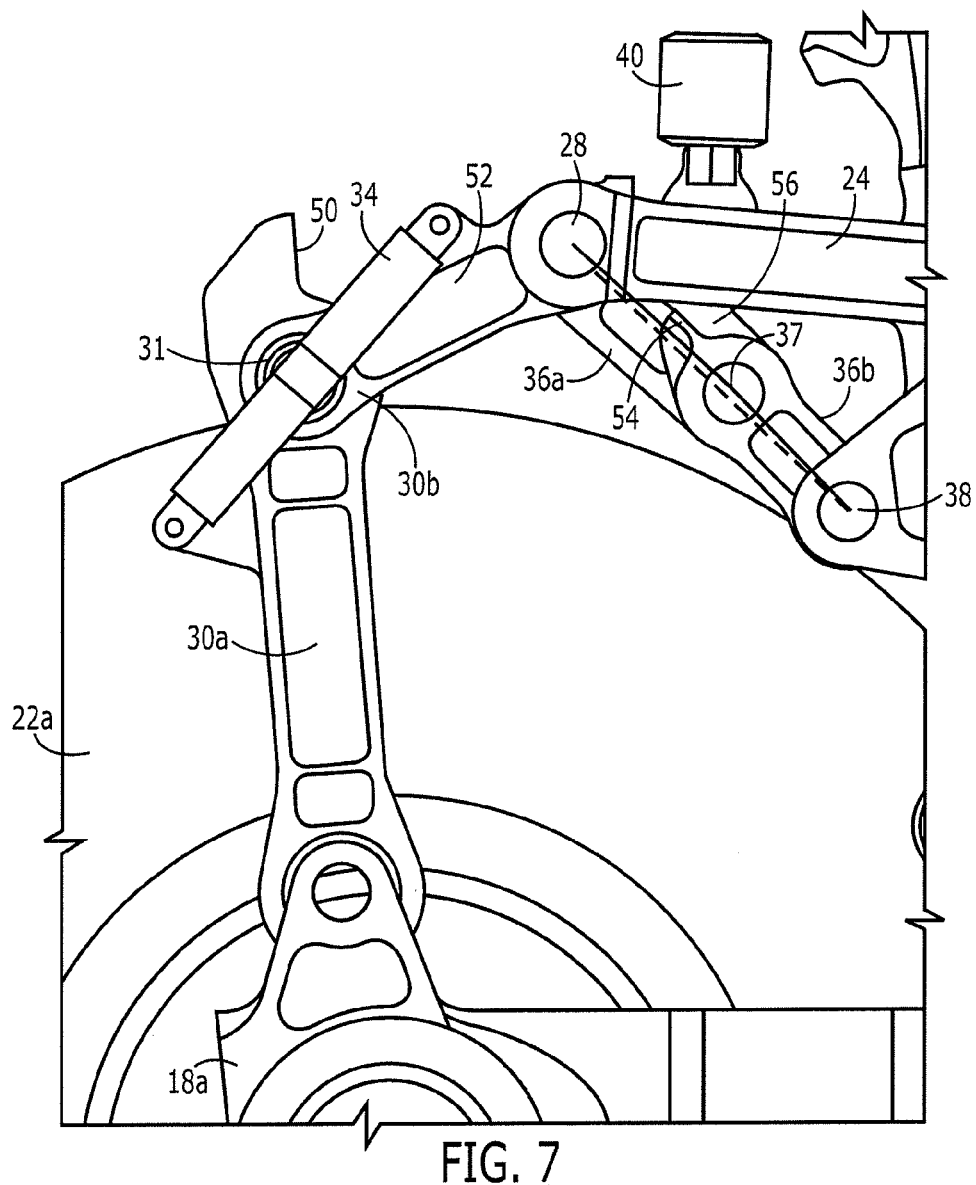
Figure 8:
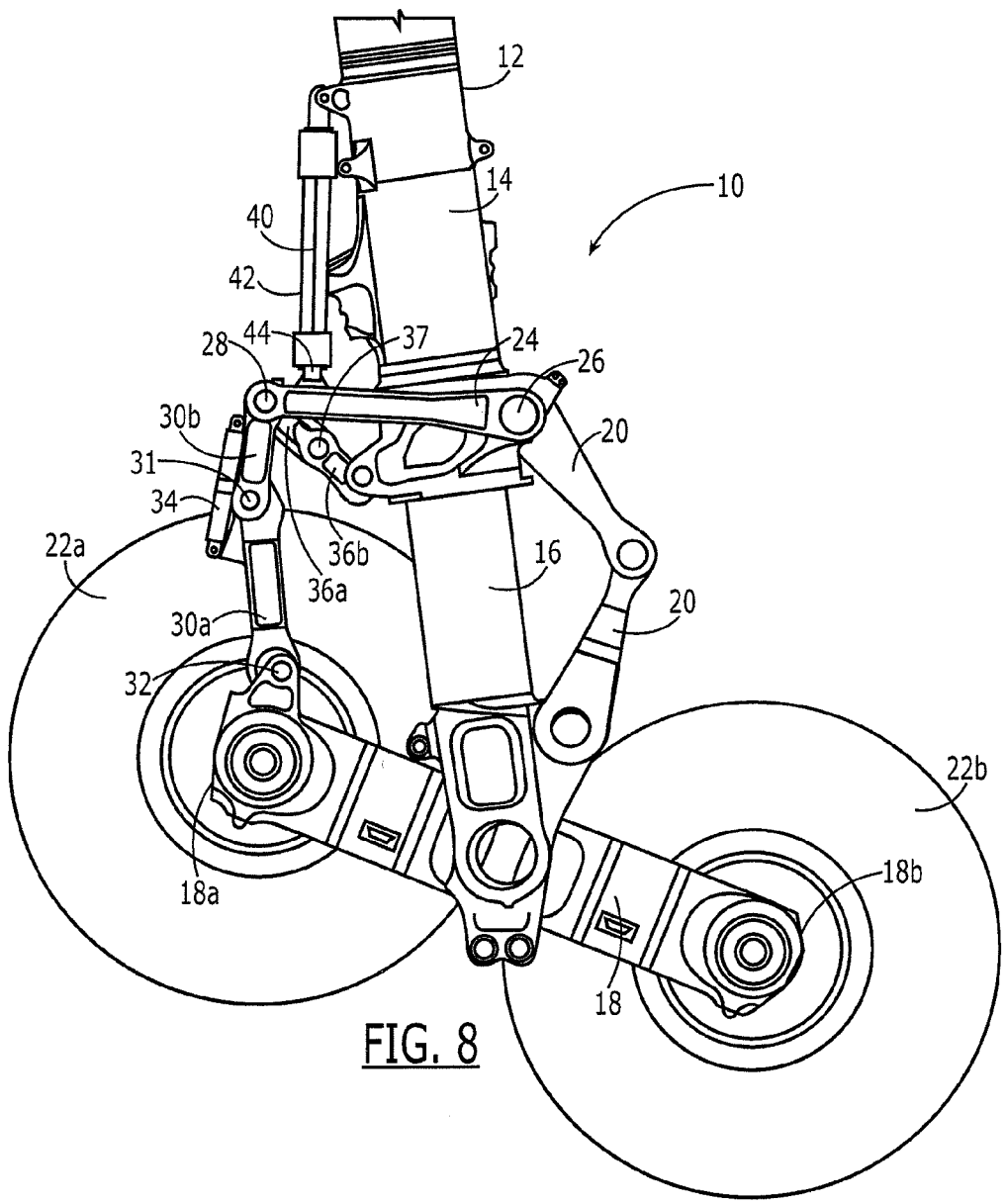
Figure 9:
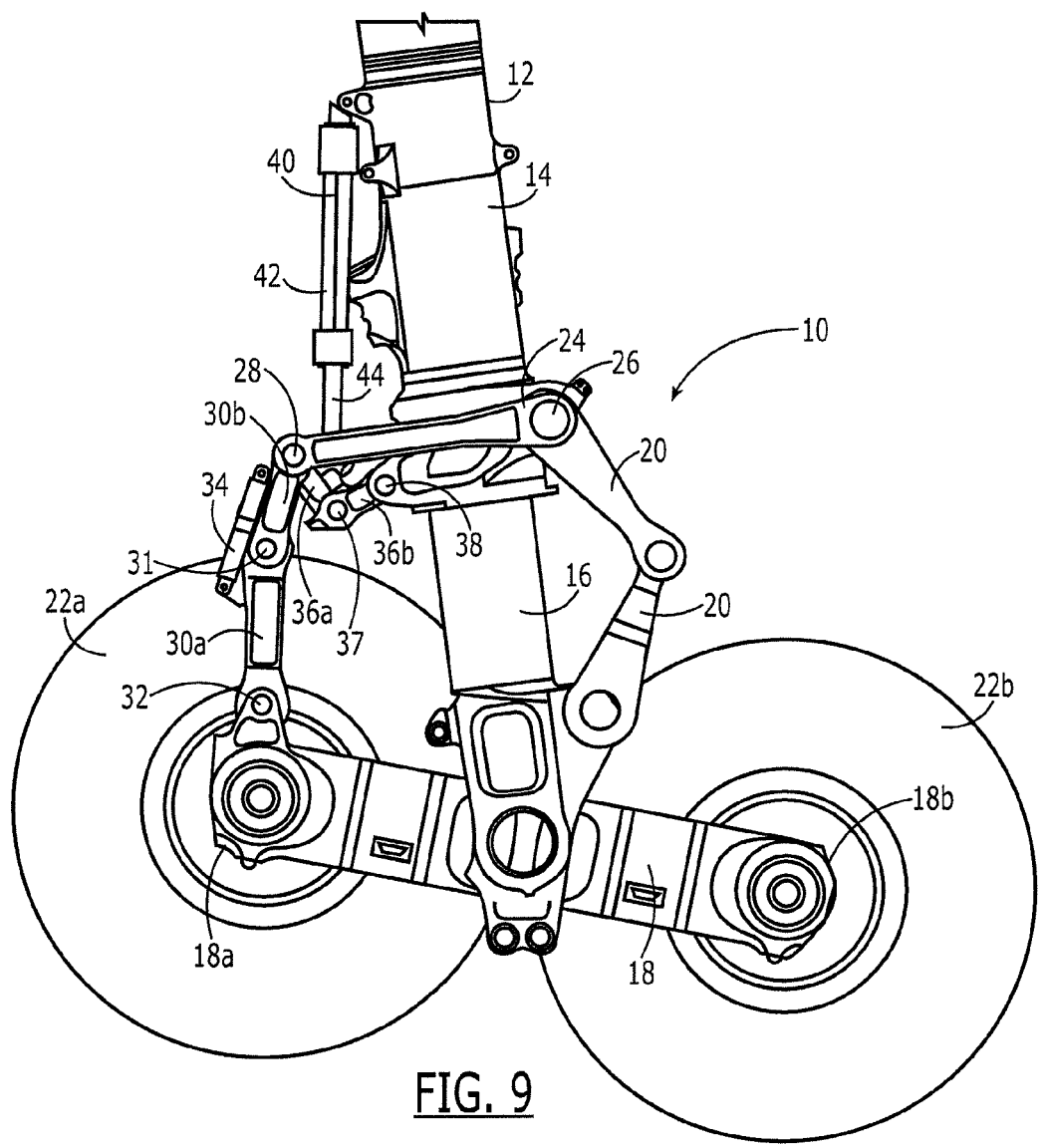
Figure 10:
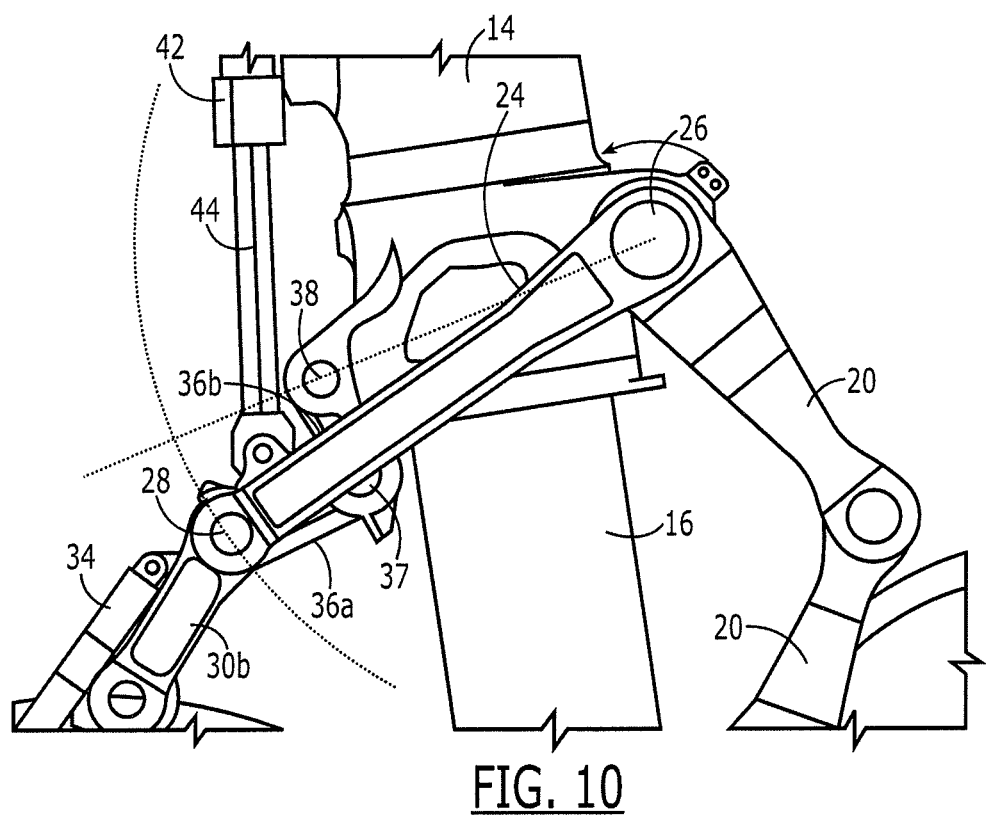
Figure 11:
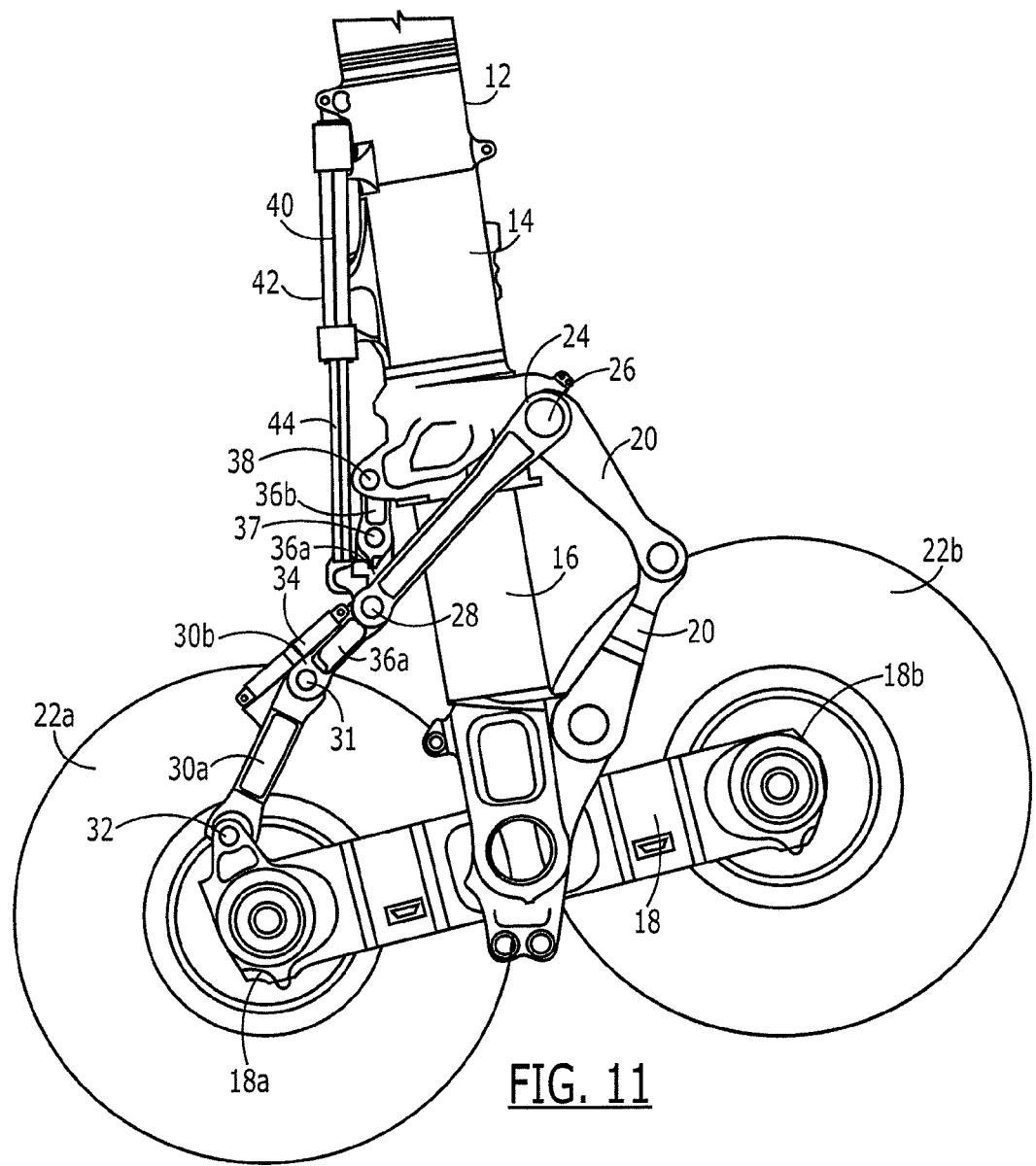
Figure 12:
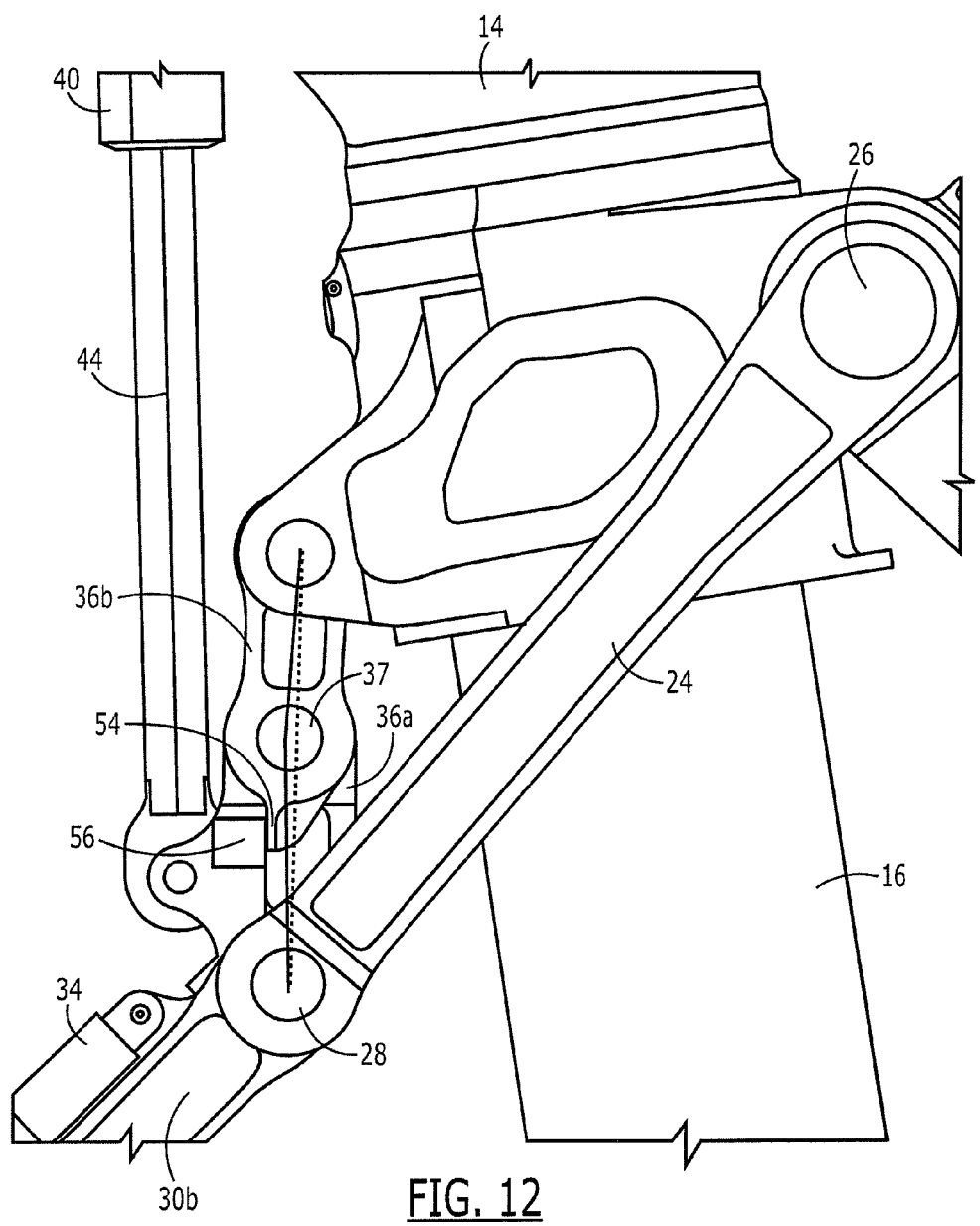
Figure 13:
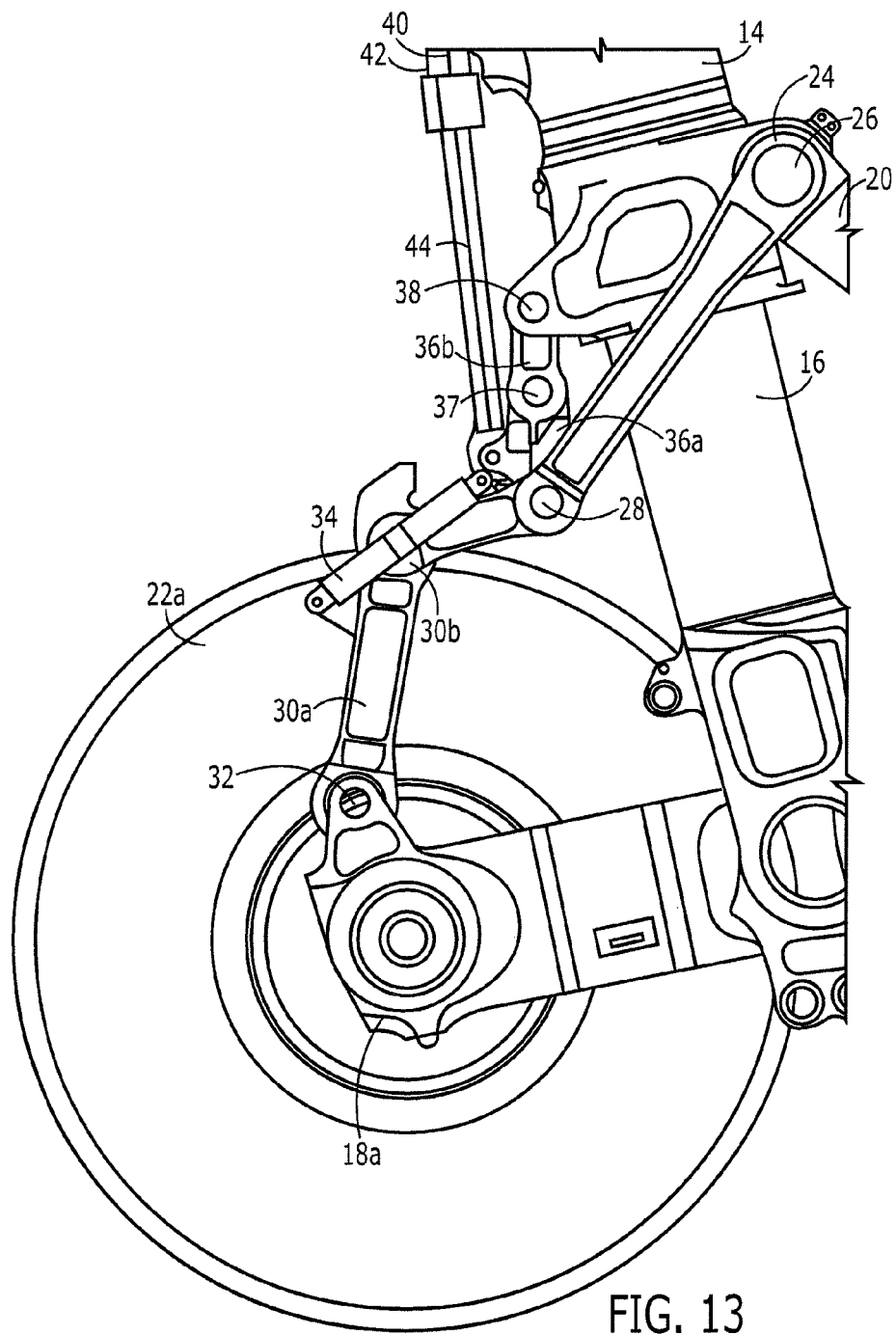
Figure 14:
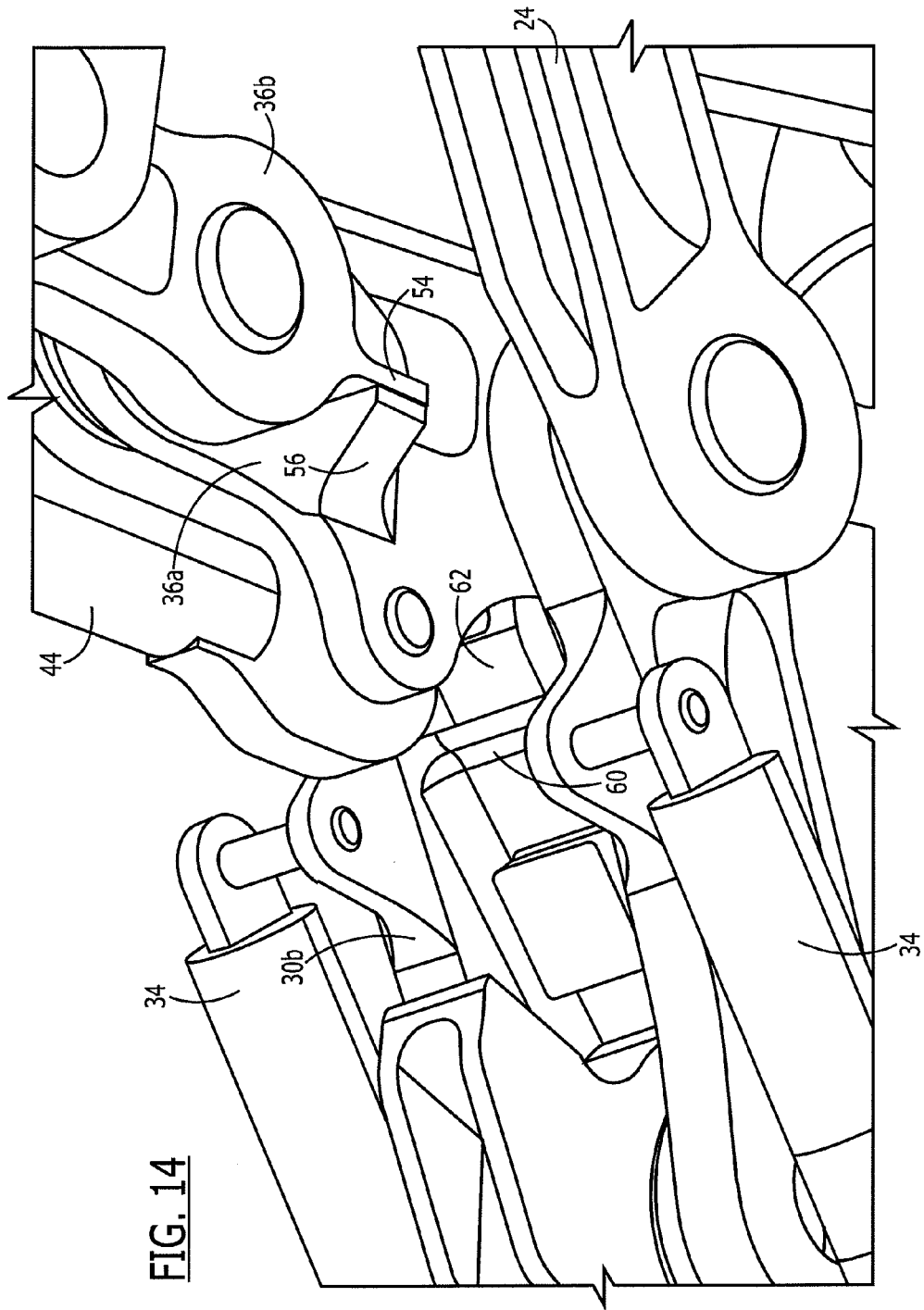
Figure 15:
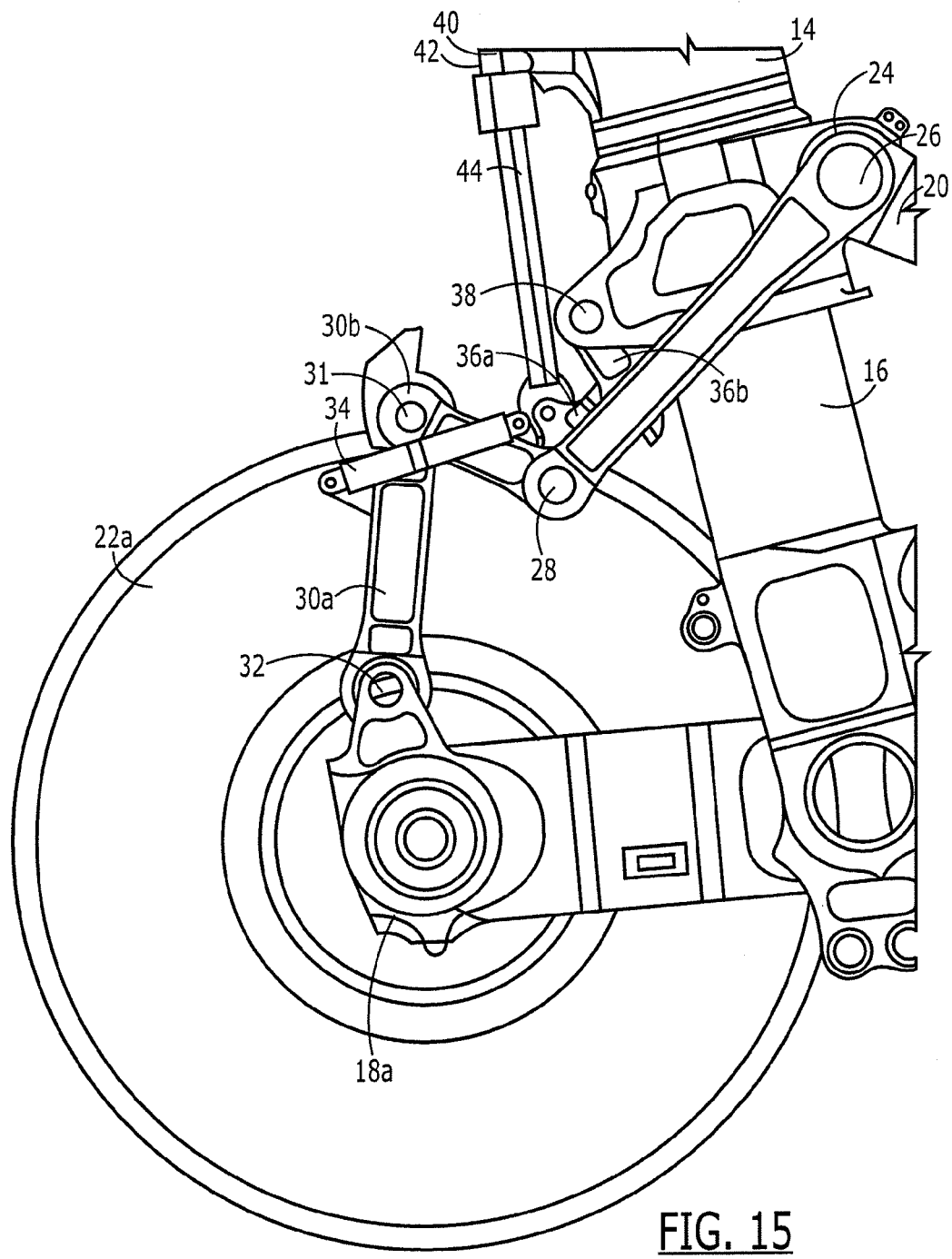
Figure 16:
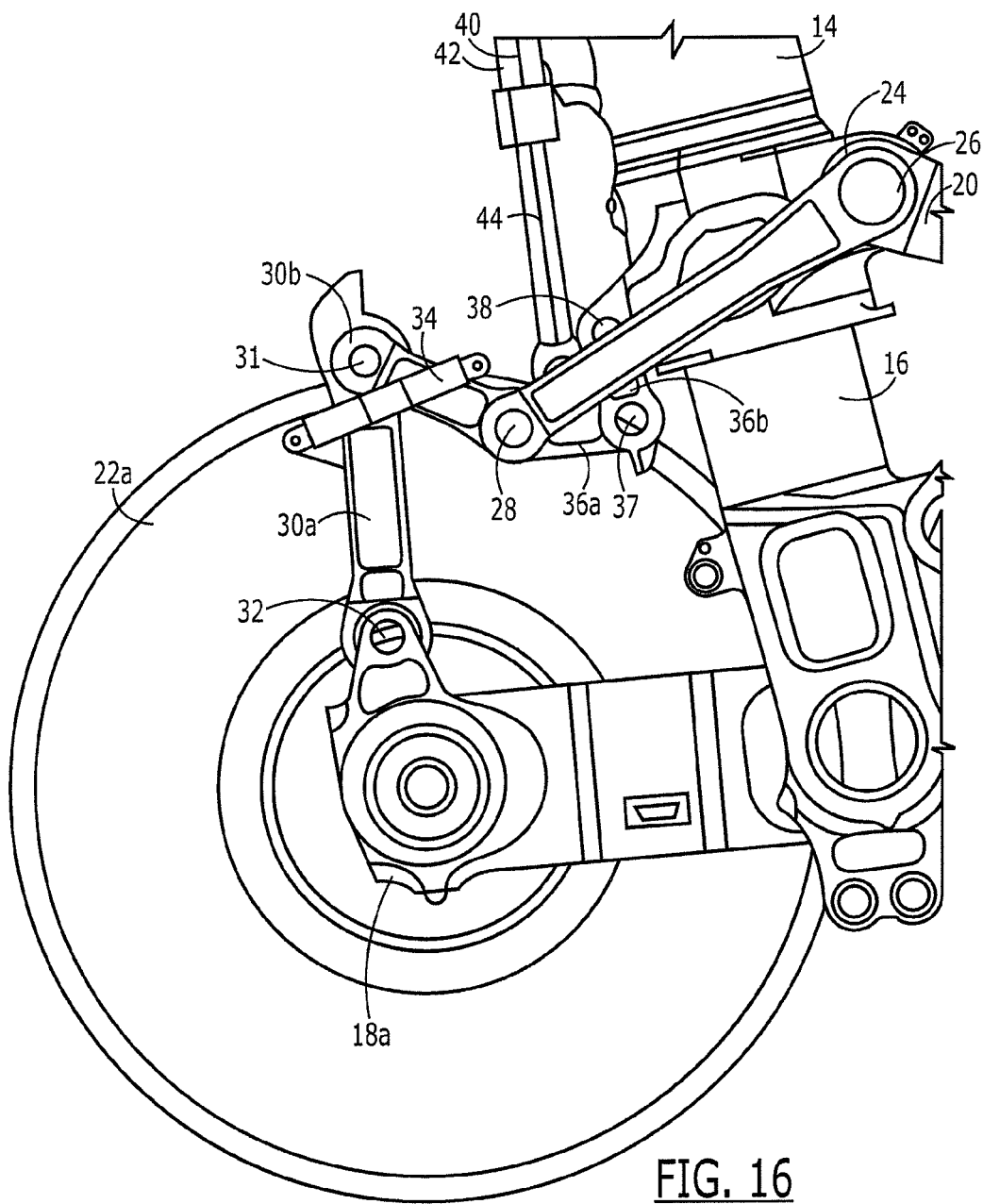
Figure 17:
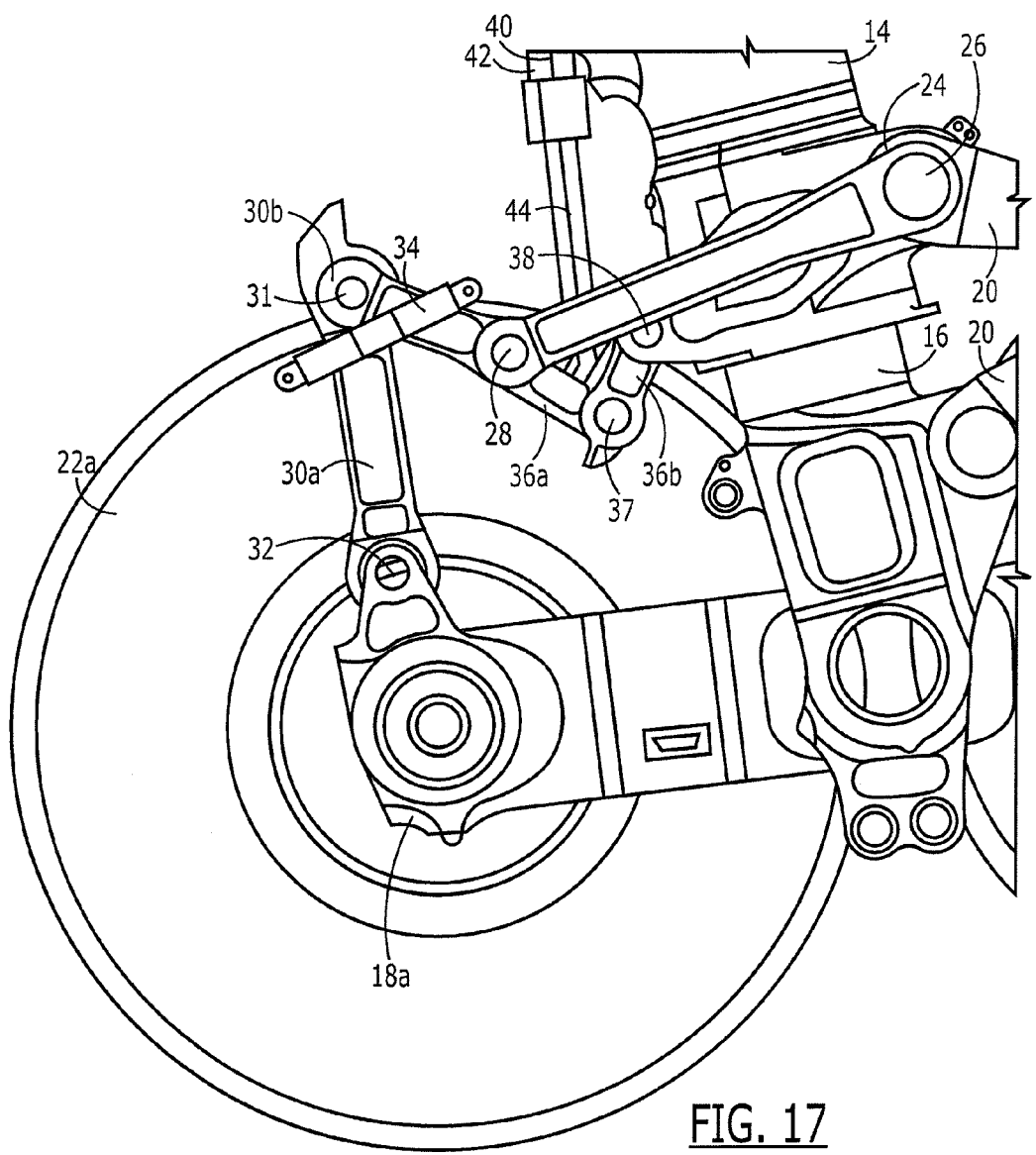
Figure 18:
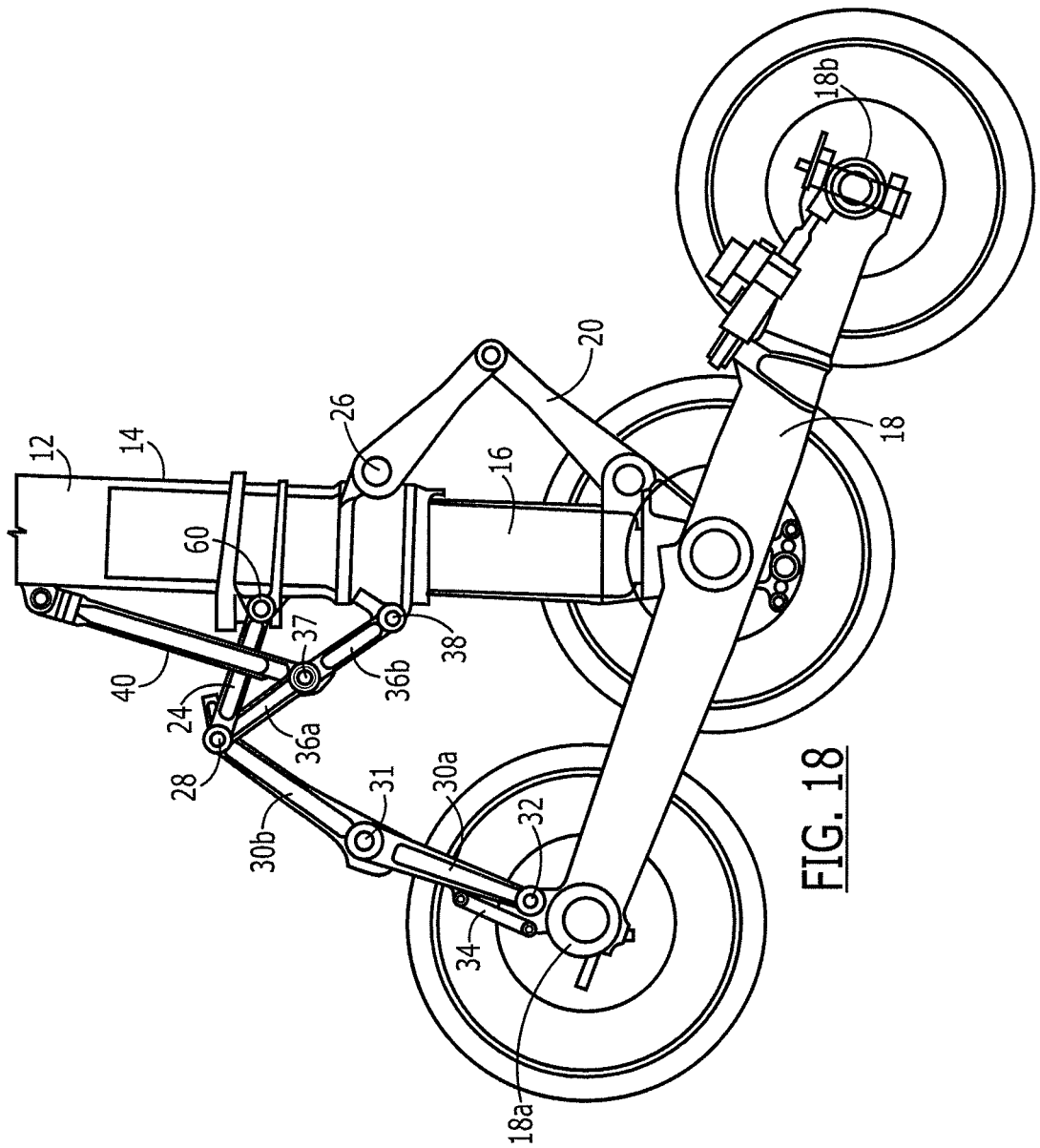

Having thus described configurations of the present disclosure in general terms, reference will now be made to the accompanying drawings, which are not necessarily drawn to scale, and wherein:

FIG. 1 is a schematic representation of a semi-levered landing gear in accordance with one configuration of the present disclosure;

FIG. 2 is a functional block diagram of a semi-levered landing gear in accordance with one configuration of the present disclosure;

FIG. 3 is a side view of a semi-levered landing gear in accordance with one configuration of the present disclosure;

FIG. 4 is another functional block diagram of a semi-levered landing gear in accordance with one configuration of the present disclosure;

FIG. 5 is a side view of the semi-levered landing gear of FIG. 3 during taxi operations in a truck pitch down configuration;

FIG. 6 is a side view of the semi-levered landing gear of FIG. 3 during taxi operations in a truck pitch up configuration;

FIG. 7 is a more detailed side view of a portion of a semi-levered landing gear of FIG. 3 which illustrates the over-center, locked position of a pair of lock links in accordance with one configuration of the present disclosure;

FIG. 8 is a side view of a semi-levered landing gear in a takeoff position with a forward end of the truck beam being in a raised position relative to an aft end of the truck beam in accordance with one configuration of the present disclosure;

FIG. 9 is a side view of the semi-levered landing gear of FIG. 8 during transition of the semi-levered landing gear from the takeoff position of FIG. 7 to a stowed position in accordance with one configuration of the present disclosure;

FIG. 10 is a detailed side view of a portion of the semi-levered landing gear that illustrates the further movement of a pair of lock links as a result of the extension of a truck pitch actuator during transition of the semi-levered landing gear from the takeoff position of FIG. 8 to a stowed position in accordance with one configuration of the present disclosure;

FIG. 11 is a side view of a semi-levered landing gear in a stowed position in which the forward end of the truck beam is in a lower position relative to the aft end of the truck beam in accordance with one configuration of the present disclosure;

FIG. 12 is a detailed side view of a portion of a semi-levered landing gear of FIG. 11 which illustrates the over-center position of the pair of lock links in accordance with one configuration of the present disclosure;

FIG. 13 is a side view of the semi-levered landing gear of FIG. 11 as the semi-levered landing gear linkage begins to fold upon contact with the ground during an alternate extension landing in accordance with one configuration of the present disclosure;

FIG. 14 is a detailed perspective view of a portion of the semi-levered landing gear of FIG. 13 which illustrates the interaction of the stop features in accordance with one configuration of the present disclosure;

FIG. 15 is a side view of the semi-levered landing gear of FIGS. 11 and 13 as the semi-levered landing gear linkage continues to fold during an alternate extension landing in accordance with one configuration of the present disclosure;

FIG. 16 is a side view of the semi-levered landing gear of FIGS. 11, 13 and 15 which illustrates the truck pitch actuator being back-driven in accordance with one configuration of the present disclosure;

FIG. 17 is a side view of the semi-levered landing gear of FIGS. 11, 13, 15 and 16 illustrating the nominal position of a semi-levered landing gear once the aircraft is on the ground after an alternate extension landing in accordance with one configuration of the present disclosure; and FIG. 18 is a side view of a semi-levered landing gear in accordance with another configuration of the present disclosure.

DETAILED DESCRIPTION

The present disclosure now will be described more fully hereinafter with reference to the accompanying drawings, in which some, but not all configurations of the disclosures are shown. Indeed, these configurations may take many different forms and should not be construed as limited to that set forth herein; rather, these configurations are provided so that this disclosure will satisfy applicable legal requirements. Like numbers refer to like elements throughout.

Referring now to FIGS. 1 and 2, a schematic representation and a functional block diagram of a semi-levered landing gear 10 in accordance with one configuration are respectively depicted. As shown, the semi-levered landing gear includes a shock strut 12 extending downwardly from the fuselage of an aircraft or other air vehicle. As described below, the shock strut generally includes an outer cylinder 14 and an inner cylinder 16. The semi-levered landing gear may include torsion links 20 extending between the inner and outer cylinders for preventing relative rotation therebetween. The semi-levered landing gear also includes a truck beam 18 pivotally connected to the shock strut. In the illustrated configuration, the truck beam is pivotally attached to a distal end or lower end of the shock strut so as to vertically move in concert with the inner cylinder. The truck beam extends from a forward end 18a to an opposed aft end 18b with the forward end extending toward the forward end of the aircraft and the aft end extending toward the aft end of the aircraft. The truck beam of the illustrated configuration includes a pair of axles with one axle pivotally connected proximate the forward end of the truck beam and another axle pivotally connected proximate the aft end of the truck beam. As shown in FIG. 1, one or more tires 22a, 22b may be mounted upon each axle so as to support the aircraft during ground operations.

The semi-levered landing gear 10 of FIGS. 1 and 2 may also include a plurality of links for angularly orienting the truck beam 18. In this regard, the semi-levered landing gear may include a semi-levered landing gear linkage 30 including, for example, a first link 30a connected to the truck beam at a first pivot, such as a first pivot pin 32, and a second link 30b connected to the first link at a second pivot, such as a second pivot pin 31. Additionally, the semi-levered landing gear may include a third link 24 connected to the second link at a third pivot, such as a third pivot pin 28, and connected to the outer cylinder 14 of the shock strut 12 at a fourth pivot, such as a fourth pivot pin 26. Although the torsion links 20 are also shown to be connected to the outer cylinder at the fourth pivot pin, such coincidence is not necessary and, instead, the third link and the torsion links may be connected to the outer cylinder at different locations. Further, the semi-levered landing gear of FIGS. 1 and 2 may include a truck pitch actuation system 40 configured to position at least one of the plurality of links so as to angularly orient the truck beam. Although one configuration of the truck pitch actuation system is described in detail below, the truck pitch actuation system may be configured in a number of different manners and, as such, may comprise a plurality of links, levers, linear or rotary actuators that can be powered hydraulically, electrically, pneumatically, etc., or the like. In one operational mode, such as during take-off, the truck pitch actuation system of one configuration is configured to maintain the third pivot in a fixed first relationship with respect to the outer cylinder, thereby allowing a forward end 18a of the truck beam 18 to be raised, relative to an aft end 18b of the truck beam, during extension of the shock strut in this operational mode. In another operational mode, such as during flight with the landing gear stowed, the truck pitch actuation system may also be configured to maintain the third pivot in a fixed second relationship with respect to the outer cylinder, thereby allowing the truck beam to be positioned by the aircraft in a stow orientation.

In one configuration, the first and second links 30a, 30b have a range of angular rotation with respect to one another that is limited to an off-center orientation. In this regard, the truck beam 18 may have a pitch at take-off that is limited by the off-center orientation between the first and second links, the extension of the shock strut 12 and the positional relationship of the third pivot to the outer cylinder 14. As described below, the first and second links may include respective stops for limiting relative movement of the first and second links.

In accordance with one, more detailed configuration, a semi-levered landing gear 10 is depicted in FIG. 3. The semi-levered landing gear includes a shock strut 12 extending downwardly from the fuselage of an aircraft. As noted above, the shock strut generally includes an outer cylinder 14 and an inner cylinder 16. In one configuration, the shock strut is maintained under a relative high pressure, such as a nitrogen pressure of about 2500 pounds per square inch (PSI), that attempts to extend the inner cylinder. While the aircraft is on the ground, however, the weight on the landing gear overcomes the pressure under which the strut is maintained such that the shock strut remains in a compressed position as shown in FIG. 3. As shown in FIG. 3, the semi-levered landing gear may include torsion links 20. The torsion links may include a pair of interconnected links connected at opposed ends to respective lugs carried by the outer cylinder and the inner cylinder. The semi-levered landing gear of the illustrated configuration also includes a truck beam 18 pivotally connected to a distal end or lower end of the shock strut so as to vertically move in concert with the inner cylinder. The truck beam may be pivotally connected to the shock strut by means of a pivot pin extending through both the distal or lower end of the shock strut and an intermediate portion of the truck beam.

The semi-levered landing gear 10 also includes a semi-levered landing gear mechanism including at least three links configured to angularly orient the truck beam 18. The at least three links include a pair of off-center links, such as the first and second links 30a, 30b discussed above and a third link 24, such as a pivot link. The off-center links may be pivotally connected to the truck beam at a first pivot pin 32, to one another at a second pivot pin 31 and to the third link at a third pivot pin 28. In this regard, the truck beam may include a lug proximate the forward end 18a with the off-center links being connected to the lug of the truck beam by means of the first pivot pin. The third link may, in turn, extend between the third pivot pin at which the third link is pivotally connected to the pair of off-center links and a fourth pivot pin 26 at which the third link is pivotally connected to the shock strut, such as the outer cylinder 14 of the shock strut. As shown in FIG. 3, for example, the fourth pivot pin may also serve to pivotally attach one of the torsion links 20 to a lug carried by the outer cylinder of the shock strut. As noted above, however, the third link and the torsion links need not both be pivotally attached to the outer cylinder by the fourth pivot pin and, instead, the torsion links may be pivotally attached to the outer cylinder at a position offset from the third link.

In the illustrated configuration, the pair of off-center links include the first and second links 30a, 30b that form a semi-levered landing gear linkage 30 that may be connected at the third pivot pin 28 to the third link 24 and at the first pivot pin 32 to the truck beam 18. The second link of this configuration may be connected at the third pivot pin to the third link and at the second pivot pin 31 to the first link. The first link is, in turn, connected at the second pivot pin to the second link and at the first pivot pin to the truck beam, such as the lug carried by the forward end 18a of the truck beam. As described below, the semi-levered landing gear linkage may also include a biasing device, such as a spring 34. Although the spring may be differently positioned in other configurations, the spring of the configuration illustrated in FIG. 3 is connected to and extends between the first and second links. The spring may be a tension spring such that in instances in which the first and second links are on-center or otherwise aligned, the spring attempts to maintain the first and second links in the on-center or aligned relationship. Other types of biasing devices may be employed in other configurations.

The semi-levered landing gear mechanism may also include a pair of lock links. The pair of lock links are connected at the third pivot pin 28 to both the third link 24 and to the semi-levered landing gear linkage 30 and at a sixth pivot pin 38 to the shock strut 12. In this regard, the shock strut may include a lug, such as a lug carried by the outer cylinder 14 of the shock strut, with the sixth pivot pin extending through both the lug and a respective lock link. In the illustrated configuration, the pair of lock links includes first and second lock links 36a and 36b. The first lock link may be connected at the third pivot pin to both the third link and to the semi-levered landing gear linkage and at a fifth pivot pin 37 to the second lock link. The second lock link may, in turn, be connected at the fifth pivot pin to the first lock link and at the sixth pivot pin to the shock strut.

The semi-levered landing gear mechanism may also include a truck pitch actuation system 40. In the illustrated configuration, for example, the truck pitch actuation system includes a truck pitch actuator that extends between the shock strut and a respective lock link. In this regard, the truck pitch actuator may be connected at one end, such as via a pin, to a lug carried by the shock strut, such as the outer cylinder 14 of the shock strut, and at the other end to a lug carried by a respective one of the lock links, such as the first lock link 36a. In this regard, the truck pitch actuator may be connected to an intermediate portion of the first lock link between the third pivot pin 28 and the fifth pivot pin 37. As described below, the truck pitch actuator may be actuated hydraulically, pneumatically or otherwise such that an inner cylinder 44 may be controllably extended, retracted or otherwise positioned relative to an outer cylinder 42 in order to at least partially position the truck beam 18 relative to the shock strut when the airplane is in the air. As noted above, the truck pitch actuation system may be differently configured in other configurations of the present disclosure.

As shown in FIG. 4, the semi-levered landing gear mechanism allows multiple operational modes depending upon whether the commanded position of the landing gear is up (raised) or down (lowered), whether the landing gear is functioning properly and is fully operational and whether the third pivot is in a first position or a second position as shown in blocks 100-108. For example, during normal taxi operations as shown in block 110 of FIG. 4, both the shock strut 12 and the truck pitch actuation system 40 are in a taxi position with the shock strut being compressed as shown in block 112. The semi-levered landing gear linkage 30 is configured during normal taxi operations so as to permit the truck beam 18 to pivot freely as indicted in block 114 so as to have a horizontal orientation, as shown in FIG. 3, a truck pitch down orientation, as shown in FIG. 5, or a truck pitch up orientation as shown in FIG. 6, in order to accommodate some variation in the angle between the shock strut and the ground over which the aircraft is taxiing. As shown by FIGS. 4-6, the third pivot remains in substantially the same first position in each of the orientations, e.g., the horizontal, truck pitch down and truck pitch up orientations, so as to control the range of pivotal motion permitted for the truck beam as a result of opening and closing of the first and second links 30a, 30b. In this regard, the first and second links are generally opened or extended to define an obtuse angle therebetween that opens toward the truck beam as shown in FIG. 5 in order to permit the forward end 18a of the truck beam to be lowered relative to the aft end 18b of the truck beam in a truck pitch down configuration. Conversely, the first and second links may be further folded so as to define a smaller acute angle therebetween, as shown in FIG. 6 in order to raise the forward end of the truck beam relative to the aft end of the truck beam in the truck pitch up configuration. The first and second links may include respective lock stops 50, 52 for limiting relative movement of the semi-levered landing gear links. As shown in FIG. 7, for example, an end of the first link 30a proximate the second pivot pin 31 may include a lock stop 50, while an intermediate portion of the second link 30b may include a corresponding lock stop 52. As such, as the semi-levered landing gear linkage is opened as shown in FIG. 5, the lock stops will engage, such as by bringing the lock stop of the second link into contact with the corresponding lock stop of the first link in order to limit or prevent further opening of the semi-levered landing gear linkage and to correspondingly prevent further downward movement of the forward end of the truck beam relative to the aft end of the truck beam.

Similarly, the first and second lock links 36a, 36b may include respective lock stops 54, 56 for limiting relative movement of the first and second lock links. As also shown in FIG. 7, the second lock link 36b may include a lock stop 54 at the end of the second lock link proximate the fifth pivot pin 37, while an intermediate portion of the first lock link 36a may include a corresponding lock stop. As the pair of lock links are opened, the corresponding lock stops of the pair of lock links will engage or physically contact one another and prevent further unfolding or opening of the pair of lock links. While the pair of lock links and the corresponding lock stops may be configured in various manners, the pair of lock links may be configured to be in-line in instances in which the lock stops have engaged one another or to be in an over-center configuration as shown in FIG. 7 in instances in which the pair of lock links have been opened beyond an in-line position by a predetermined amount. As indicated by the solid lines in the illustrated configuration, for example, the pair of lock links define an interior angle of about 175 degrees in instances in which the respective lock stops have been engaged. For point of comparison, an in-line position is also depicted by FIG. 7 in dashed lines. However, the pair of lock links and the respective lock stops may define other degrees of being over-center in other configurations. By configuring the pair of lock links to have an over-center position once the corresponding lock stops have been engaged, the pair of lock links will be effectively prevented from collapsing under a compressive load.

As noted above, the shock strut 12 is maintained under a relatively high pressure. In the take-off mode shown in block 116 of FIG. 4, as the aircraft accelerates down a runway during takeoff, lift is created by the wings and other aerodynamic surfaces. The lift removes at least some of the load from the landing gear 10 with a reduced load allowing the shock strut to extend in response to the relatively high pressure maintained thereby. See block 118 of FIG. 4. In order to provide additional ground clearance for rotation of the aircraft during takeoff, the semi-levered landing gear mechanism of one configuration is configured to position the forward end 18a of the truck beam 18 in a raised position relative to the aft end 18b of the truck beam as shown in the toes-up configuration of FIG. 8. See also block 120 of FIG. 4. In this regard, the semi-levered landing gear mechanism is configured to cooperate with an extension of the shock strut 12, such as an extension of the inner cylinder 16 relative to the outer cylinder 14 of the shock strut in response to the lift that is created and the corresponding reduction in the load on the landing gear. Since the truck pitch actuation system 40 remains in a retracted position and the third pivot remains in the first position in the take-off mode, the third link 24 and the first and second lock links 36a, 36b remain in the same fixed position relative to the outer cylinder 14 of the shock strut 12 as the inner cylinder 16 of the shock strut is being extended. However, the semi-levered landing gear linkage 30 opens to the extent permitted by the respective lock stops 50, 52 (see FIG. 7) of the first and second links 30a, 30b. As the inner cylinder 16 of the shock strut 12 is extended by a greater distance than may be accommodated by the opening of the semi-levered landing gear linkage 30, the semi-levered landing gear linkage limits the downward travel of the forward end 18a of the truck beam 18 in response to the extension of the inner cylinder 16 of the shock strut 12 such that the aft end 18b of the truck beam 18 is lowered relative to the forward end of the truck beam.

Following takeoff, the truck beam 18 remains in the toes-up attitude with the shock strut 12 extended as shown in block 124 of FIG. 4. However, the landing gear 10 may not generally be stowed within a wheel well while in a toes-up attitude. Instead, the truck beam may need to be repositioned to another attitude so as to be stowed within the wheel well. In accordance with configurations of the present disclosure, when the landing gear is commanded by the pilot, flight control system or the like to retract to the stow mode as shown in block 122 of FIG. 4, a command is correspondingly issued to the truck pitch actuation system 40 so as to cause, for example, the truck pitch actuator to extend, such as by extending the inner cylinder 44 relative to the outer cylinder 42 (see FIG. 9). As shown in FIG. 9 in which the landing gear is in an intermediate position between the toes-up attitude and the toes-down attitude, the extension of the truck pitch actuator causes the first and second lock links 36a, 36b to be unlocked and to fold relative to one another. However, the biasing device, such as spring 34, of the semi-levered landing gear linkage maintains the first and second links 30a, 30b in a fully opened position. The extension of the truck pitch actuator causes the third pivot to move to the second position with the third link 24 being caused to rotate in a counterclockwise direction about the fourth pivot pin 26 and correspondingly causes the truck beam 18 to rotate in a counterclockwise direction about the pivot pin that connects the truck beam to the shock strut 12 such that the forward end 18a of the truck beam is lowered relative to the aft end 18b of the truck beam. Further extension of the truck pitch actuator causes the pair of lock links 36a, 36b to further fold so as to define a smaller acute angle therebetween. The continued movement of the pivot link also causes the first lock link 36a to rotate in a counterclockwise direction about the third pivot pin 28 and causes the second lock link 36b to rotate in a clockwise direction about the sixth pivot pin 38, as shown in FIG. 10.

The extension of the truck pitch actuator 40 may continue until the first and second lock links 36a, 36b lock in a fully open or extended position. As described above, a pair of lock links may include respective lock stops 54, 56 (see FIG. 12) for limiting the relative movement of the first and second lock links 36a, 36b and defining a fully opened or extended position, as shown in FIG. 11. In this regard, FIG. 12 provides an illustration of the pair of lock links 36a, 36b in a fully extended position with the respective lock stops 54, 56 defining the fully extended position to be over-center. By appropriately attaching the truck pitch actuation system 40 relative to the shock strut 12 and to the pair of lock links 36a, 36b, a single truck pitch actuation system, such as a single truck pitch actuator, may advantageously move the remainder of the semi-levered landing gear mechanism between an up and locked position and a down and locked position. Additionally, it is noted that loads to the third pivot pin 28 are distributed through the truss created by the third link 24 and the pair of lock links 36a, 36b to the outer cylinder 14 of the shock strut 12 such that the truck pitch actuation system 40 is not in the load path. Once fully extended, the landing gear 10 is in a stowed position with the forward end 18a of the truck beam 18 in a lower position relative to the aft end 18b of the truck beam. Once in the stowed position as shown in block 126 of FIG. 4, the landing gear may be retracted and stowed within a wheel well during the course of a flight.

Landing gear extension, such as in advance of the landing of an aircraft, may be performed in the inverse sequence of operations described in conjunction with the retraction of the landing gear 10 including a return of the third pivot to the first position. In this regard, once the landing gear has been removed from the wheel well with the shock strut 12 extended, the truck pitch actuation system 40, such as a truck pitch actuator, may be retracted so as to return the landing gear to a toes-up attitude, as shown in FIG. 8. See also blocks 128, 130 and 132 of FIG. 4. Alternatively, the truck pitch actuation system may be only partially retracted such that, for example, the inner cylinder 44 of the truck pitch actuator has an intermediate position between the fully extended and fully retracted positions relative to the outer cylinder 42 of the truck pitch actuator. In this configuration, the forward end 18a of the truck beam 18 may be raised relative to the aft end 18b of the truck beam, but not to the same degree as in the toes-up configuration of FIG. 8. By only partially retracting the truck pitch actuation system, the truck pitch actuation system can then act as a truck pitch dampener upon landing.

In yet another configuration, the semi-levered landing gear 10 may support an alternate extension landing in instances in which the landing gear is not functioning normally and, therefore, is not fully operational, as shown in block 134 of FIG. 4. In this regard, the landing gear may be extended without power in some situations. For example, an alternate extension landing system may include a dedicated battery to release the landing gear and locks associated with the doors of the wheel wells in which the landing gear is stowed. The landing gear may then extend by gravity with the shock strut 12 continuing to be extended as shown in block 136 of FIG. 4, but the alternate extension landing system may not have sufficient power to reposition the landing gear from the toes-down stowed position to the toes-up landing position. In this configuration, the semi-levered landing gear is configured to back-drive the semi-levered landing gear mechanism and to unlock the pair of lock links 36a, 36b, thereby preventing damage to the semi-levered landing gear in the event of an alternate extension landing. In an alternate extension landing, the landing gear unfolds from the wheel well, but remains in a stowed or toes-down configuration with the truck pitch actuation system 40 extended and the third pivot in the second position, as shown in FIG. 11. See also block 138 of FIG. 4. Upon contact with the ground and the application of an upwardly directed force to the tire 22a carried by the forward end 18a of the truck beam 18, the semi-levered landing gear linkage 30 folds as shown in FIG. 13. The folding of the semi-levered landing gear linkage continues until a stop feature 60 of the second link 30b contacts the corresponding stop feature 62 of the first lock link 36a, as shown in FIG. 14. As shown in FIG. 15, further folding of the semi-levered landing gear linkage 30 causes the pair of lock links 36a, 36b to unlock and fold. The semi-levered landing gear linkage continues to fold until the semi-levered landing gear linkage reaches a minimum fold angle, as defined by corresponding stops 54, 56 carried by the first and second lock links 36a, 36b (see FIG. 14). In this regard, the semi-levered landing gear linkage is configured to define a minimum fold angle so as to prevent collision between the second link and the truck pitch actuation system, such as the truck pitch actuator. When the semi-levered landing gear linkage 30 reaches its minimum fold angle, the stops of the second link 30b and the first lock link 36a will disengage or unlock as a result of a force applied to the third link 24 by the semi-levered landing gear linkage 30 that causes the third link to rotate clockwise, as shown in FIG. 16. The pair of lock links 36a, 36b are, in turn, driven by the clockwise motion of the pivot link which, in turn, causes the truck pitch actuation system to be back-driven in order, for example, to cause the inner cylinder 44 of the truck pitch actuator to be retracted within the outer cylinder 42. This process continues until a position as shown in FIG. 17 is reached with the aircraft having landed on the ground. The semi-levered landing gear linkage will then remain in this position until hydraulic pressure is restored to the system, at which time the truck pitch actuation system will further retract, causing the pair of lock links 36a, 36b to open and to lock in a fully open or extended position, as shown in FIG. 8 in preparation for the next takeoff.

As described above, the semi-levered landing gear 10 of configurations of the present disclosure is advantageously passive so as to lock automatically upon takeoff and to unlock automatically upon landing. The semi-levered landing gear of one configuration also advantageously repositions the truck beam 18 from the takeoff position to the stowed position with a single truck pitch actuator 40 so as to eliminate requirements for additional systems that otherwise add to the complexity, weight and cost of the landing gear. The weight-carrying capacity of the airplane may be increased. Further, the semi-levered landing gear of one configuration removes the truck pitch actuation system from the semi-levered landing gear load path in order to reduce the size and complexity of the truck pitch actuation system. The semi-levered landing gear of configurations of the present disclosure advantageously utilize the same system to position the landing gear in one of various configurations. Examples of such configurations include a toes-up attitude (for takeoff/landing) and a toes-down attitude (for stowage in the wheel well or for an alternate extension landing).

Many modifications and other configurations of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific configurations disclosed and that modifications and other configurations are intended to be included within the scope of the appended claims. For example, FIG. 18 depicts an alternative configuration of a semi-levered landing gear that includes three axles. Although a number of components of the semi-levered landing gear are the same in construction, interconnection and function as described above, several aspects of the semi-levered landing gear of FIG. 18 have been modified. In this regard, while the third link 24 remains pivotally connected to the shock strut 12, the third link of this configuration is pivotally connected to a lug 60 that is connected to the shock strut, such as the outer cylinder 14 of the shock strut. As will be noted, the lug 60 is positioned above the sixth pivot pin 38 and is spaced apart from the fourth pivot pin 26 by which the torsion links 20 are pivotally connected to the shock strut. Also, the truck pitch actuation system 40 of the configuration of FIG. 18 is pivotally connected to the pair of lock links 36a, 36b at the fifth pivot point 37, as opposed to being connected to the first lock link 36a intermediate of the third and fifth pivot pins 28, 37 as in the above-described configuration. Additionally, the biasing device, such as spring 34, of the semi-levered landing gear linkage is positioned differently than that described above, namely, the spring extends between an intermediate portion of the first link 30a and a lug carried by the forward end 18a of the truck beam 18. Thus, although specific terms are employed herein, they are used in a generic and descriptive sense only and not for purposes of limitation.

The invention claimed is:

1. A method of positioning a truck beam of a landing gear of an airplane, the method comprising:
providing a semi-levered landing gear mechanism comprising a plurality of links operably connected between a shock strut and the truck beam and a truck pitch actuation system, wherein providing the semi-levered landing gear mechanism comprises providing the shock strut so as to have an inner and an outer cylinder, providing the truck beam so as to be pivotally connected to the inner cylinder of the shock strut, providing a first link connected to the truck beam at a first pivot, a second link connected to the first link at a second pivot and a third link connected to the second link at a third pivot and connected to the outer cylinder at a fourth pivot, and providing the truck pitch actuation system so as to be operatively connected to the third pivot so as to position the third pivot in a first position or a second position;
positioning a forward end of the truck beam in a raised position relative to an aft end of the truck beam by causing the truck pitch actuation system to be in a takeoff position while the airplane is in air; and
positioning the forward end of the truck beam in a lower position relative to the aft end of the truck beam by causing the truck pitch actuation system to be in a stow position while the airplane is in the air to facilitate retraction of the landing gear.

2. The method of claim 1 wherein the plurality of links comprise a semi-levered landing gear linkage and a first and a second lock link, wherein positioning the forward end of the truck beam in the raised position relative to the aft end of the truck beam comprises positioning the semi-levered landing gear linkage and the first and the second lock link to define an acute angle therebetween that opens toward the truck beam, and wherein positioning the forward end of the truck beam in the lower position relative to the aft end of the truck beam comprises positioning the semi-levered landing gear linkage and the first and the second lock link to define an obtuse angle therebetween that opens toward the truck beam.

3. The method of claim 2 further comprising maintaining the semi-levered landing gear linkage in an extended position as the truck beam is repositioned from a landing position in which the forward end of the truck beam is in the raised position relative to the aft end of the truck beam to the stow position in which the forward end of the truck beam is in the lower position relative to the aft end of the truck beam.

4. The method of claim 2 wherein the first and the second lock link are extended in both a landing position in which the forward end of the truck beam is in the raised position relative to the aft end of the truck beam and the stow position in which the forward end of the truck beam is in the lower position relative to the aft end of the truck beam, and wherein the method further comprises causing the first and the second lock link to fold as the truck beam is repositioned from the landing position to the stow position.

5. The method of claim 1 further comprising permitting the plurality of links to fold so that the forward end of the truck beam is raised relative to the aft end of the truck beam in response to a force on the forward end of the truck beam while the forward end of the truck beam is positioned in the lower position relative to the aft end of the truck beam.

6. The method of claim 1 wherein a weight-carrying capacity of the airplane is increased.

7. The method of claim 1 further comprising maintaining the third pivot in the first position with the third pivot having a fixed first relationship with respect to the outer cylinder so as to allow raising of the forward end of the truck beam, relative to the aft end of the truck beam, during extension of the shock strut.

8. The method of claim 1 further comprising maintaining the third pivot in the second position with the third pivot having a fixed second relationship with respect to the outer cylinder so as to allow positioning of the truck beam in the stow position.

9. The method of 1 wherein the first and the second links have a range of angular rotation with respect to one another that is limited to an off-center orientation in which the first and second links are not aligned.

10. The method of claim 9 wherein positioning the forward end of the truck beam in the raised position relative to the aft end of the truck beam comprises limiting a pitch of the truck beam at take-off by the off-center orientation between the first and the second link and extension of the shock strut.

11. The method of claim 1 wherein the first and the second link comprise respective stops for limiting relative movement of the first and the second link.

12. The method of claim 1 wherein providing the semi-levered landing gear mechanism further comprises providing at least one biasing device extending between the first and the second link.

13. The method of claim 1 wherein providing the semi-levered landing gear mechanism further comprises providing at least one biasing device extending between the first link and the truck beam.

14. The method of claim 1 wherein providing the semi-levered landing gear mechanism further comprises providing a first and a second lock link, wherein the first lock link is connected at the third pivot to the third link and at a fifth pivot to the second lock link, and wherein the second lock link is connected at the fifth pivot to the first lock link and at a sixth pivot to the shock strut.

15. The method of claim 14 wherein the truck pitch actuation system is operatively connected to the first lock link intermediate of the third and the fifth pivot.

16. The method of claim 14 wherein the first and the second lock link comprise respective stops for limiting relative movement of the first and the second lock link.

\* \* \* \* \*